United States Patent [19]

Hunt

[11] Patent Number: 4,890,373
[45] Date of Patent: Jan. 2, 1990

[54] PIPE REPAIR APPARATUS AND METHOD

[76] Inventor: William G. Hunt, 1210 E. Main St., Sunset Beach, N.C. 28459

[21] Appl. No.: 208,769

[22] Filed: Jun. 20, 1988

[51] Int. Cl.$^4$ .......................... B23P 7/00; B21D 37/00
[52] U.S. Cl. ............................... 29/402.09; 29/402.19; 72/412; 156/94; 269/269
[58] Field of Search ............ 29/402.09, 402.19, 469.5; 72/412, 413, 416, 454; 138/99, 97; 156/94; 269/247, 268, 269, 282; 228/119

[56] References Cited

U.S. PATENT DOCUMENTS

| 1,704,760 | 3/1929 | Parker | 138/99 |
| 2,325,417 | 7/1943 | Merrill et al. | 156/94 X |
| 2,734,409 | 2/1956 | Schum et al. | 269/282 X |
| 2,850,045 | 9/1958 | Soehnlen et al. | 138/99 |
| 3,163,200 | 12/1964 | Broske et al. | 72/412 |
| 3,675,916 | 7/1972 | Kartasuk et al. | 269/282 X |

FOREIGN PATENT DOCUMENTS

| 158607 | 11/1932 | Switzerland | 138/99 |
| 2157389 | 10/1985 | United Kingdom | 138/97 |

Primary Examiner—Howard N. Goldberg
Assistant Examiner—Andrew E. Rawlins
Attorney, Agent, or Firm—Clifton Ted Hunt

[57] ABSTRACT

A quick, easy, and permanent inline repair of a ruptured pipe is accomplished by the use of one of a firmly of rigid covers shaped to cover the rupture and adhering the rigid cover in sealing relation over the rupture. A utility tool is disclosed that may be used to restore the expanded metal surrounding a rupture in a freeze burst copper water pipe to its intended position in line with the pipe before the rupture is covered with a rigid cover.

10 Claims, 4 Drawing Sheets

U.S. Patent   Jan. 2, 1990   Sheet 1 of 4   4,890,373
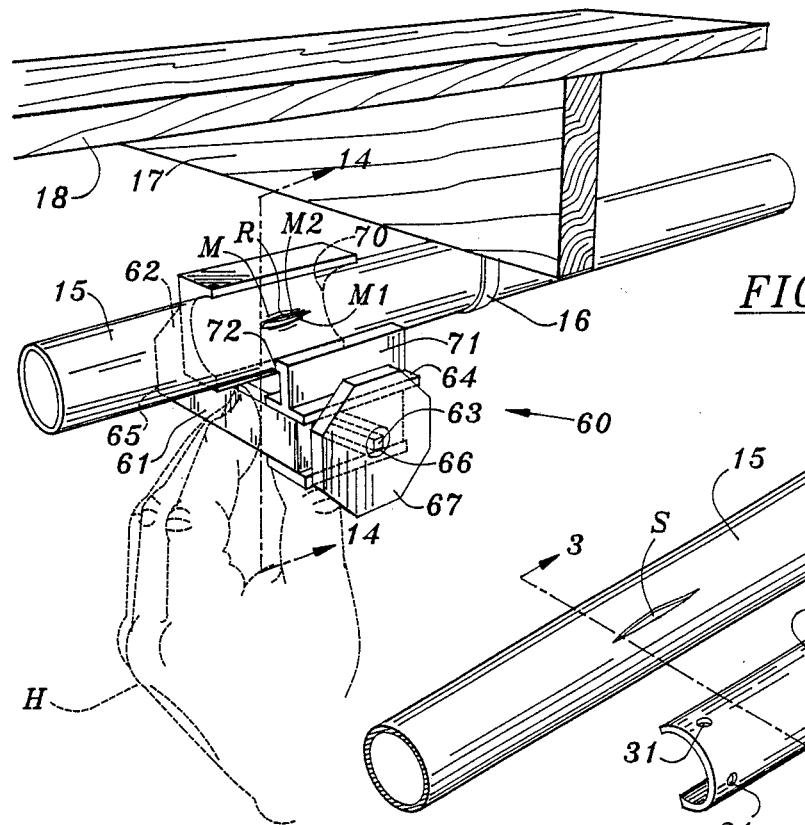
FIG. 1
FIG. 2
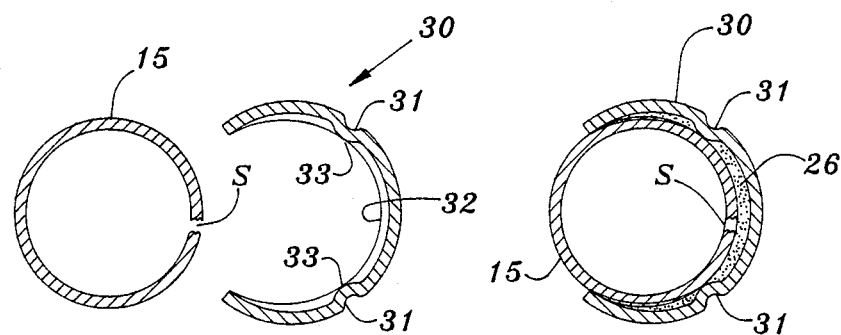
FIG. 3
FIG. 4

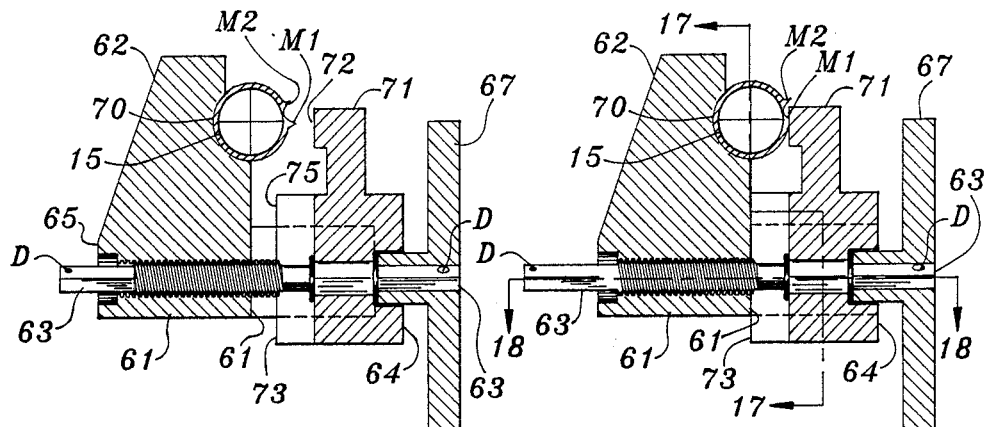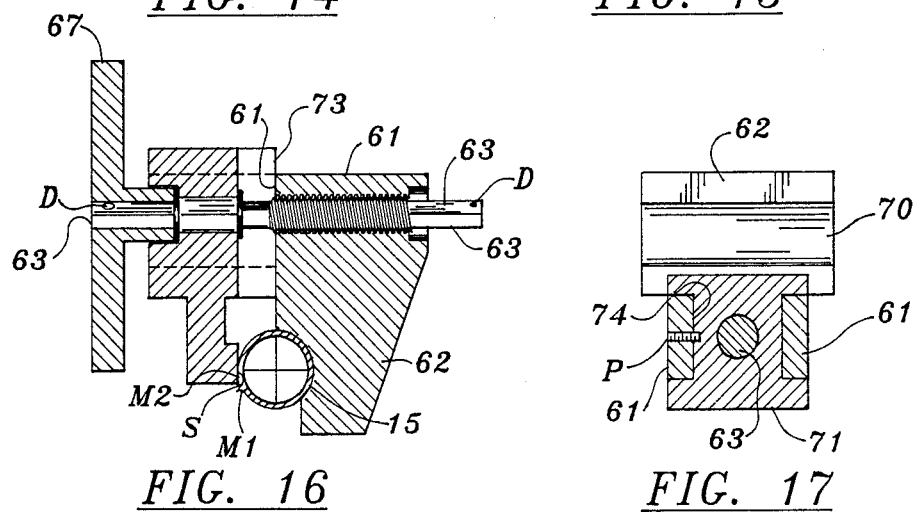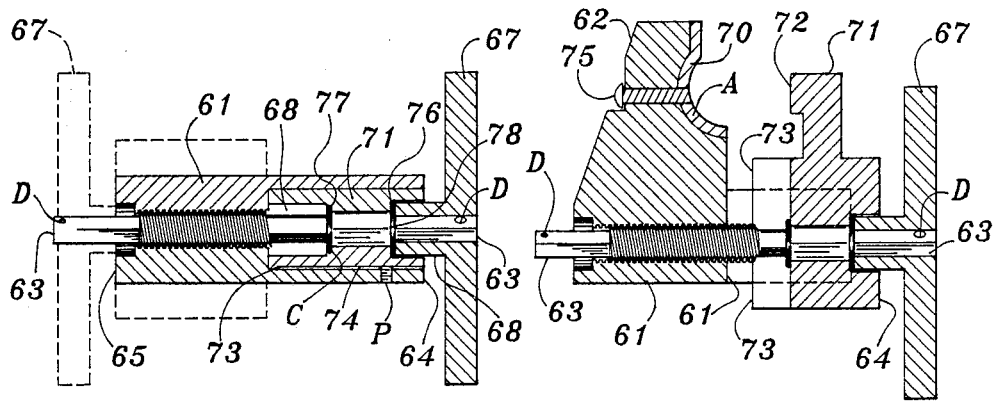

PIPE REPAIR APPARATUS AND METHOD

FIELD OF THE INVENTION

This invention relates to the repair of pipes, and more particularly to the repair of holes in pressurized water pipes.

BACKGROUND OF THE INVENTION

The transport and distribution of potable water uses a network of pipes to move the water, under pressure, to its destination. Up until about thirty or forty years ago pipes for carrying pressurized potable water were made of cast iron or galvanized iron. More recently, pipes for the distribution of pressurized water are generally made of copper or plastic.

All water pipes are subject to rupture because of the expansion of freezing water within them, yet many water pipes are not adequately protected against freezing. Consequently, a lot of pipes are ruptured in freezing weather.

Leaks are also caused by the deterioration of iron pipes over a period of about thirty years. Small pinholes eventually develop because the flow of water under pressure causes deterioration to begin on the inside of iron pipes and to progress outwardly over a period of time.

Water is conventionally carried through pipe systems under from 75 to 100 pounds pressure, and a lot of water under that pressure can escape through just a small hole in a very short time. It is important that the water be turned off just as soon as a leak is discovered. Most homeowners realize the importance of turning off the water and take the responsibility for that initial step. The next step for most homeowners, due to the complexity of the standard repair procedure, is to call a plumber and wait perhaps for days until one is available.

RUPTURES IN PIPES MADE FROM COPPER, GALVANIZED IRON AND PLASTIC

Copper pipes, iron pipes, and plastic pipes are in use today for transporting gas or water under 75 to 100 pounds of pressure. Each of them is subject to developing leaks because of freezing, or otherwise. It is the quick, efficient, and permanent repair of leaks in these pipes with which the present invention is concerned.

Copper Pipes are generally considered the best and are the most commonly used for water distribution in the home and in industry. Copper is a soft metal, handles high water pressure, and is easy to work. Copper pipe will burst if over exposed to freezing temperature. The water inside the pipe expands as it freezes and usually pushes the soft metal upwardly and outwardly forming a mound around the rupture in the copper pipe. The rupture is usually a split extending parallel with the pipe and is generally about ¼" to ¾" in length. The metallic mound around the rupture usually extends at least ⅛ of an inch radially beyond the circumference of the pipe.

Galvanized Iron Pipe was in general use for water pipe up until about thirty years ago. Very little is used now for water pipe. Galvanized iron pipe has a wall thickness of about ⅛" and is stronger than copper pipe. However, the expansion of freezing water inside an iron pipe will rupture the pipe. Because of the strength of iron pipe the freeze rupture is usually just a slit extending parallel with the pipe without any significant outward expansion of metal to form a mound such as is generally found in freeze burst copper pipe.

In addition to being vulnerable to freezing temperatures, iron pipes are also subject to leaking through pin holes which develop as the iron pipes rust from the inside out over a period of about thirty years or more. This is currently a problem in older homes all over the country.

PLASTIC PIPE is generally made from polyvinylchloride and is inexpensive, flexible, and easy to install. For these reasons it is being widely used today in new water systems. Lacking the flexibility of copper, a freeze burst plastic pipe will generally have a longitudinal slit that is similar to the slit that develops in a freeze burst iron pipe, without a radially extending mound.

THE PRIOR ART

According to standard practice, a permanent pipe repair requires removal of the ruptured portion of the pipe and the installation of a replacement pipe. This involves the provision of a length of replacement pipe, two couplings, and, if it is a copper pipe, a blow torch and a soldering job.

A plumber's skills are required to perform the twenty four operations in the standard repair of a hole in a copper pipe:

| | |
|---|---|
| 1. Sand and steel wool the damaged pipe to the left of the hole; | 8. Sand and steel wool the right end of the replacement pipe; |
| 2. Sand and steel wool the damaged pipe to the right of the hole; | 9. Sand and steel wool the left coupling; |
| 3. Cut the damaged pipe to the left of the hole; | 10. Sand and steel wool the right coupling; |
| 4. Cut the damaged pipe to the right of the hole; | 11. Return to the damaged pipe; |
| 5. Provide a length of replacement pipe; | 12. Flux paste the damaged pipe to the left of the hole; |
| 6. Measure and cut replacement pipe; | 13. Flux paste the damaged pipe to the right of the hole; |
| 7. Sand and steel wool the left end of the replacement pipe; | 14. Flux paste the left end of the replacement pipe; |
| 15. Flux paste the right end of the replacement pipe; | 20. Put the replacement pipe and couplings between the ends of the damaged pipe; |
| 16. Flux paste the left coupling; | 21. Align the pipes for soldering; |
| 17. Flux paste the right coupling; | 22. Light the blowtorch; |
| 18. Place coupling on left end of replacement pipe; | 23. Apply heat and solder to the left coupling; and |
| 19. Place coupling on right end of replacement pipe; | 24. Apply heat and solder to the right coupling. |

A similar procedure is carried out for the standard permanent repair of holes in iron and plastic pipe, except that appropriate steps for fastening the couplings to the ruptured pipe and to the replacement pipe are substituted for the soldering steps enumerated above.

K-POXY STEEL PUTTY is the brand name of a product manufactured by McKim Group, 225 Riverview Avenue, Waltham, Mass. 02254. That product is described by its manufacturer as being useful in the repair of leaking pipes. The manufacturer recommends the following procedure:

(a) Clean, dry, and roughen the area around the leak.
(b) Cut a piece of fiberglass tape long enough to wrap around the pipe three times.
(c) Thoroughly mix the K-POXY STEEL PUTTY as instructed on the box or jar.

(d) Spread the mixed K-POXY on one side of the tape and wrap it three times around the pipe—K-POXY side down.

(e) Cover the tape with more K-POXY and allow it to cure one to three hours.

There is no other known prior art for the permanent repair of holes in metal and plastic pipes.

U.S. Pat. No. 1,704,760 issued Mar. 12, 1929 to Howard Parker for REPAIR ELEMENT FOR FIBROUS CONDUITS shows the use of a fibrous "snap repair element" to repair holes in fibrous conduit used for electric wiring and water. The fibrous conduit is formed by winding a web of cellulose pulp or a sheet of paper on a mandrel until a tube having a desired wall thickness has been formed. The fibrous tube is dried and waterproofed by impregnating it with pitch.

Parker's "snap repair element" is made of the same fibrous material as is used in making the fibrous tube and is also waterproofed by impregnating it with pitch. Parker's repair element is a short length of semi-cylindrical fibrous conduit having an inside diameter equal to the outside diameter of the fibrous conduit to be repaired. The repair is made by clamping the repair element over the ruptured portion and covering the repair element and the neighboring pipe portion with molten asphalt or cement.

There is no suggestion in Parker that his snap repair element formed of pitch covered fibrous material is useful in repairing anything but pitch covered fibrous conduit. It would not be useful in today's technology. It is obsolete.

SUMMARY OF THE INVENTION

The invention comprises a semi-cylindrical rigid cover having the cross sectional configuration of the letter "C" and herein sometimes called a C-clip. The C-clip is formed of copper or plastic to tightly clamp on a pipe and cover a hole.

A professional and permanent repair of a hole in a pipe can be made by one not skilled in plumbing by applying a quick acting bonding agent to the space inside the medial portion of a C-clip and then clamping the C-clip over the hole in the pipe to permanently seal the hole in a leakproof manner.

When used by a skilled plumber, the invention reduces his time and material costs more than 65% for each repair.

The disclosure includes several embodiments for providing the space to receive and retain a bonding agent between the medial portion of the C-clip and the rupture in the pipe. One of these embodiments provides enough space to accomodate the usual mound around the rupture in a freeze burst copper pipe.

Alternatively, the invention provides a hand held utility tool for restoring the expanded copper defining the mound to its intended position in line with the pipe before a rigid cover is clamped and sealed over the remaining slit.

Another embodiment of the rigid cover uniformly fits snugly against the pipe with no space between the cover and the pipe. It is intended that this cover be soldered to the pipe after it has been clamped over the ruptured area.

The peripheral edges of one embodiment of the rigid cover fit snugly against the pipe so that solder can be used in lieu of a bonding agent, if desired, to seal the cover over the rupture.

BRIEF DESCRIPTION OF THE DRAWINGS

FIG. 1 is a perspective environmental view, with parts broken away, illustrating a freeze burst copper pipe with a mound of expanded metal surrounding the rupture and a utility tool held in operative position to restore a portion of the mound to its intended position in line with the pipe preparatory to sealing the rupture with a bonding agent and covering it with a C-clip;

FIG. 2 is an exploded perspective view of the pipe shown in FIG. 1 after use of the utility tool to restore the mound to its intended position and reduce the rupture to a slit, and showing a C-clip positioned to cover the slit;

FIG. 3 is a sectional view taken substantially along the line 3—3 in FIG. 2;

FIG. 4 is a sectional view similar to FIG. 3 but showing the C-clip and a bonding agent assembled in operative position covering and sealing the rupture;

FIG. 14 is a sectional view taken substantially along the line 14—14 in FIG. 1;

FIG. 15 is a sectional view similar to FIG. 14 but illustrating the restoration of the lower portion of the mound;

FIG. 16 is a sectional view similar to FIG. 15 but illustrating the utility tool in its operative position to restore the upper portion of the mound and illustrating the completed restoration of the mound;

FIG. 17 is a sectional view taken substantially along the line 17—17 in FIG. 15;

FIG. 18 is a sectional view taken substantially along the line 18—18 in FIG. 15; and FIG. 19 is a sectional view similar to FIG. 14 but illustrating a modified form of the utility tool wherein a removable auxiliary cradle is provided to enable the utility tool to be used with different sizes of pipe.

DETAILED DESCRIPTION OF THE INVENTION

Referring more specifically to the drawings, FIG. 1 illustrates a length of copper pipe 15 conventionally fastened as by a bracket 16 to a floor joist 17 beneath flooring 18. The pipe may carry potable water under pressure.

Figure 5:
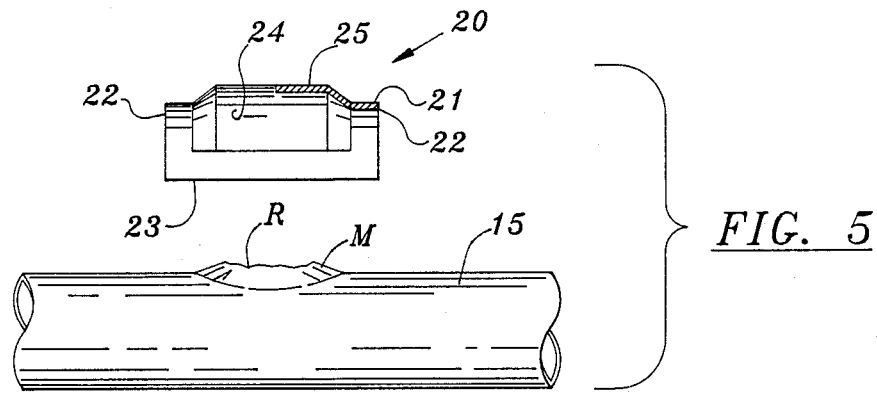
FIG. 5 is an exploded perspective view, partially in section and with parts broken away, showing a ruptured copper pipe with a mound surrounding the rupture and a chambered C-clip positioned to cover the mound and the rupture.

The copper pipe 15 is shown as having a rupture R of the type commonly caused by water freezing and expanding within the pipe. Due to the softness of copper, the expansion of the water generally causes a radially extending flaring of the metal around the rupture, resulting in the buildup of a metallic mound M around the rupture R, the mound M being more clearly shown in the elevation view of the pipe 15 in FIG. 5.

According to the invention, the mound can be restored to its intended position in line with the pipe and the rupture can be repaired inline without removing and replacing the ruptured portion of pipe.

THE CHAMBERED C-CLIP

Referring to FIGS. 5-8, a chambered C-clip is broadly indicated at 20. The chambered C-clip is preferably formed from copper in a cross-sectional arcuate configuration and is particularly intended for use on freeze burst copper pipes. The C-clip 20 includes an arcuate base 21 extending around the periphery of the cover 20 and dimensioned to fit snugly against a pipe. End edges 22 are spaced apart enough to extend beyond the rupture R. Longitudinal edges 23 clamp over the diameter of the pipe 15 as most clearly seen in FIGS. 7 and 8.

Figure 6:
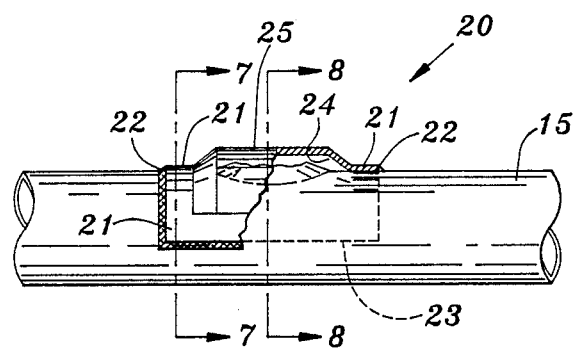
FIG. 6 is a perspective view of the pipe and C-clip shown in FIG. 5 after the chambered C-clip has been assembled to cover the rupture and the mound.
Figure 7:
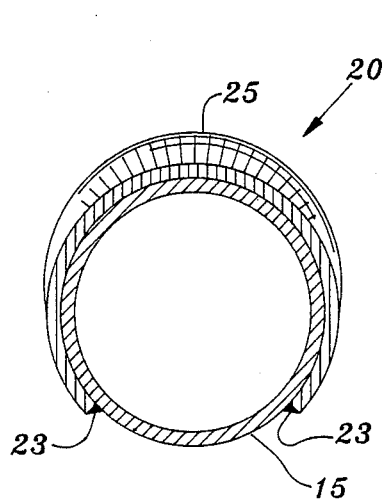
FIG. 7 is a sectional view taken substantially along the line 7—7 in FIG. 6.

The C-clip 20 includes a radially protruding chamber 24 formed by an expanded area 25 of the C-clip 20 between end edges 22 and longitudinal edges 23 of the base 21. As illustrated in FIG. 6, the chamber 24 extends sufficiently beyond the base 21 to cover the metallic mound M. Some mounds are too large to be accomodated by the chambered C-clip 40. Such mounds may be restored with the utility tool of this invention before using a bonding agent and a selected C-clip to make the repair.

The repair with the chambered C-clip 20, as with the other C-clips, is made by first turning off the water and drying and cleaning the area of the pipe neighboring the rupture. Then the inside of the chambered C-clip 20 is filled with a bonding agent 26 and the C-clip 20 is quickly clamped about the pipe 15 as shown in FIG. 6 to cover the rupture R and mound M. A preferred bonding agent cures in less than ten (10) minutes. The rupture is then permanently sealed and the pipe is restored to useful condition. The total repair time is about fifteen (15) minutes.

PREFERRED BONDING AGENTS

A preferred bonding agent cures in less than 10 minutes and is thixotropic so it will not run or drip. It will withstand thermocycling and is effective from −50 degrees to 250 degrees F.

Satisfactory bonding agents having the qualities described are sold by (1) Lucas-Milhaupt, Inc., 5555 South Pennsylvania Avenue, Cudahy, Wis. 53110 (under the brand name CHEMPCO 683); (2) Rexnord Chemical Products, Inc., 5103-T West Beloit Road, West Milwaukee, Wis. 53214 (under the brand name 4 MINUTE PUTTY); (3) Tra-Con Inc., 55-T North Street, Medford, Mass. 02155 (under the brand name TRA-BOND 2106T); and (4) McKim Group, 225 Riverview Avenue, Waltham, Mass. 02254 (under the brand name K-POXY PUTTY).

THE DIMPLED C-CLIP

Inline ruptures or slits such as shown at S in FIGS. 2-4 occur in freeze burst iron and plastic water pipes. These slits can be repaired with the dimpled C-clip 30 of FIGS. 2-4 or the recessed C-clip 40 of FIGS. 9-12 in the same manner as described for a repair with the chambered C-clip 20.

The dimpled C-clip 30 may be made of copper in an arcuate configuration to clamp over a slit S with its longitudinal edges snugly engaging the pipe as shown in FIG. 4. Dimples 31 are provided at each end of the C-clip 30. The dimples 31 protrude inwardly beyond the inner surface 32 of the C-clip 30 to define stand-offs 33 as shown in FIGS. 3 and 4. The stand-offs 33 seat against the pipe and serve as spacers to prevent the otherwise smooth inner surface of the C-clip from seating on the pipe and squeezing out the bonding agent 26.

The distance the stand-offs 33 protrude beyond the inner surface of the C-clip predetermines the layer thickness of the bonding agent between the C-clip and the pipe. A distance of 0.032 of an inch has been found satisfactory but the distance is not critical and may be changed as desired. The spacing provided by the stand-offs 33 also compensates for imperfections in the repair area such as roughness and minor variations in the diameter of the pipe.

All embodiments of the C-clip or rigid cover have a slightly larger inside diameter than the pipe they are intended to fit, but the longitudinal edge portions of the C-clips are spaced apart slightly less than the outside diameter of the pipe to snugly engage the pipe. The C-clips are thus enabled to be pressed on the pipe and be self clamping and firmly attached. The C-clip protects the layer of bonding material from external damage and ultraviolet deterioration while providing a professional looking finish to the job and restoring the pipe to at least its original strength.

THE RECESSED C-CLIP

Figure 8:
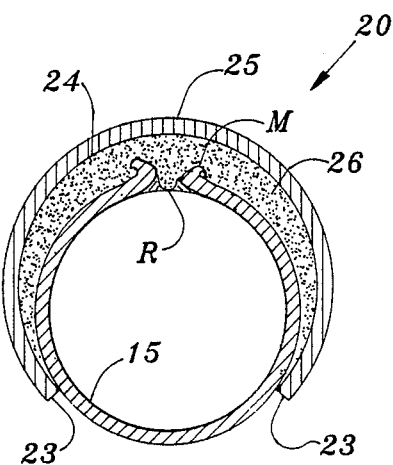
FIG. 8 is a sectional view taken substantially along the line 8—8 in FIG. 6 and showing a bonding agent sealing the rupture and bonding the chambered C-clip to the pipe.
Figures 9, 10:
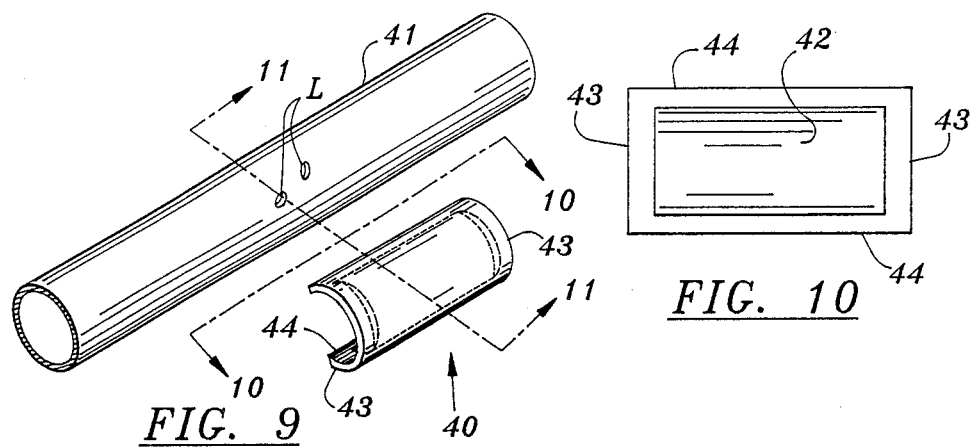
FIG. 9 is an exploded perspective view, with parts broken away, illustrating pin holes in an iron or plastic pipe and showing a recessed C-clip positioned to cover the holes.
FIG. 10 is a side elevation looking in the direction of the arrows 10—10 in FIG. 9.
Figure 11:
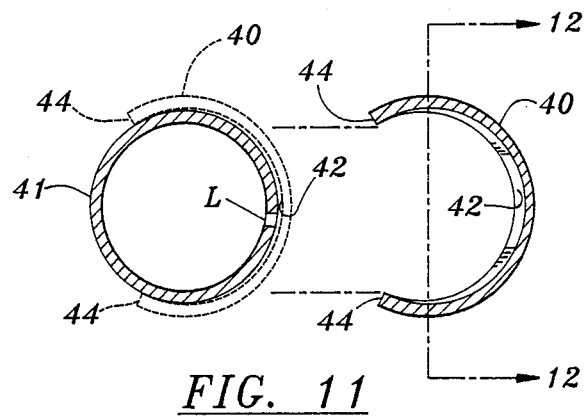
FIG. 11 is a sectional view taken substantially along the line 11—11 in FIG. 9.

The recessed C-clip 40 of FIGS. 9-12 can be used to repair the slit S of FIG. 4 and pinhole leaks such as shown at L in FIGS. 9 and 11. The recessed C-clip 40 is made of plastic and is intended for the repair of leaks in plastic or iron pipe 41. Like the other C-clips, the recessed C-clip 40 extends more than 180° around the pipe when firmly clamped over the leak L as shown in the phantom line position of FIG. 11. Unlike the chambered C-clip 20, the outer surface of the recessed C-clip 40 is uniformly smooth. A recess 42 is formed inside the C-clip 40 between its end edges 43 and its longitudinal edges 44. The recess 42 provides space for a predetermined thickness of the bonding agent such as indicated at 26 in FIGS. 4 and 8.

THE BRAILLE C-CLIP

Figures 12, 13:
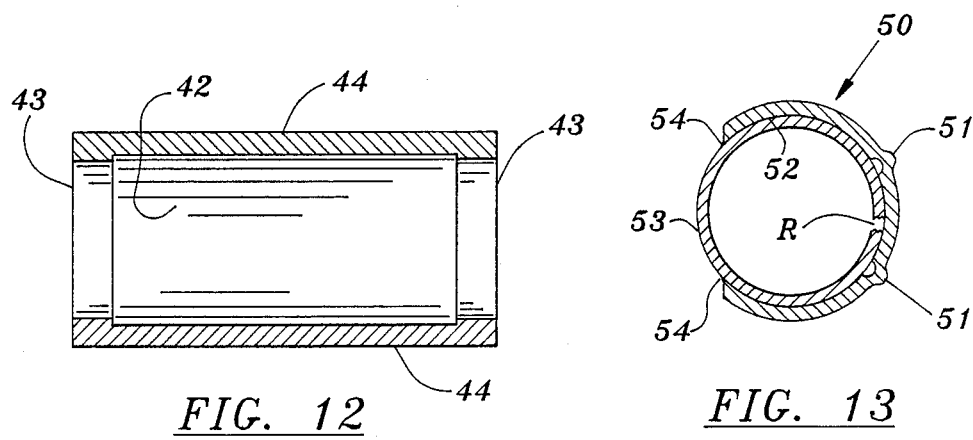
FIG. 12 is a sectional view taken substantially along the line 12—12 in FIG. 11.
FIG. 13 is a sectional view similar to FIG. 4 but illustrating a Braille C-clip soldered in place over a hole in a metal pipe.
Figure 8:
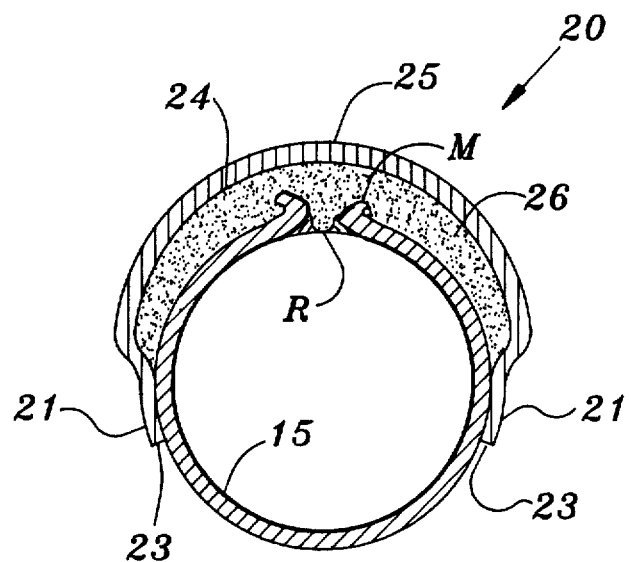

Referring to FIG. 13, a Braille C-clip 50 is like the dimpled C-clip 30 of FIGS. 1-4 except that the dimples indicated at 51 in FIG. 13 extend outwardly instead of inwardly. Instead of spacers, the outwardly extending dimples 51 serve as manual guides to enable the Braille C-clip 50 to be properly positioned over a rupture R in areas where the rupture and the C-clip cannot be seen.

The Braille C-clip 50 is illustrated as having a generally smooth inner surface 52 which uniformly fits snugly against a ruptured metal pipe 53, except for the area of the dimples 51. The Braille C-clip 50 can be soldered to a metal pipe as indicated at 53 in FIG. 13.

The showing of solder at 54 is exaggerated for the purpose of illustration. Actually, capillary action draws the solder in to completely cover the inner surface of the clip and the opposing surface of the pipe. Very little solder will be actually seen at the edges of the clip.

THE USE OF SOLDER

The chambered C-clip 20 is specifically structured to provide space for a bonding agent, but it is also structured for use with solder instead of a bonding agent, if desired. The wide marginal edges of the chambered C-clip 20 fit snugly against the pipe and solder may be satisfactorily applied in the usual manner. The completely snug fit to the pipe of the Braille C-clip 50 renders the Braille C-clip specifically structured for use only with solder. The soldering of two pieces of metal together requires a snug fit because solder is not a gap filler.

The structure of the Braille C-clip 50 can be modified so that the Braille C-clip can be sealed to the pipe with a bonding agent such as indicated at 26 in FIGS. 4 and 8. It is within the spirit of the invention to provide the Braille C-clip 50 with spacers such as provided by the stand-offs 33 in FIGS. 3 and 4 or with some other means for providing space to receive and retain a bonding agent between the pipe 53 and the C-clip 50.

THE UTILITY TOOL

Referring to FIGS. 1 and 14–19, the hand held utility tool for restoring the mound of expanded metal M to its intended position and narrowing the rupture R to a slit S is broadly indicated at 60. The utility tool 60 is a small hand tool comprising a body portion 61 including a bearing plate 62 formed integrally therewith or fixed against movement relative to the body portion 61. A shaft 63 extends beyond the front 64 and the rear 65 of the body portion 61. The shaft 63 is threadably mounted in the body portion 61 beneath the bearing plate 62. The protruding ends of the shaft 63 are squared for the selective reception of a rectangular opening 66 in the hub of a removable handle 67.

The bearing plate 62 includes an arcuate cradle 70 extending transversely across the rear 65 of the body 61 and fixed against movement relative to the body 61. The inside diameter of the cradle 70 is the same as the outside diameter of a pipe to be repaired.

A jaw 71 is freely mounted on the shaft 63 for reciprocal movement along the body portion 61 relative to the bearing plate 62 as the shaft 63 is rotated by manipulation of handle 67. The rearward portion of the jaw 71 serves as a ram 72 and extends upwardly about half the diameter of the cradle 70.

Referring to FIG. 18, the jaw 71 is supported on the shaft 63 in such a manner that the jaw 71 moves relative to the body portion 61 as the shaft is rotated. Specifically, with reference to FIG. 18, jaw 71 has a bore 68 therethrough which is of reduced diameter at the medial portion of the jaw between shoulders 76 and 77. The shaft 63 has an annular flange 78 extending thereabout between the shoulder 76 and the solid line showing of the handle 67 in FIG. 18. The shaft 63 has an annular groove 80 for reception of a retainer clip C which engages the shoulder 77 on the jaw 71 after the shaft is freely mounted in the bore 68. The flange 78 and retainer clip C bear against respective shoulders 76 and 77 responsive to rotation of the shaft in either direction to move the jaw 71 toward and away from the body portion 61 as the threaded end of the shaft 63 traverses its threaded connection with the body portion 61.

A stop pin P extends into a slot 74 formed in the side of the jaw 71. The stop pin P engages the side plate 73 of the jaw 71 to prevent the ram from being undesirably removed from the body portion 61.

Ruptures in pipes sometimes occur in inconvenient locations that are hard to reach. The utility of the tool 60 is increased by providing for the handle 67 to be attached to either end of the shaft 63. FIG. 18 shows the handle 67 in solid lines on the front end of the shaft extending through the ram and shows the handle 67 in phantom lines on the rear end of the shaft extending through the body portion 61. A spring-pressed detent D is provided adjacent each end of the shaft 63 to releaseably retain the handle 67 on a selected end of the shaft 63.

THE RESTORATION OF THE MOUND

The restoration of the mound M to substantially its original circumference is a two step process. First, the utility tool 60 is held by the user's hand (shown in phantom lines and indicated at H in FIG. 1) against the pipe with the pipe nested in the cradle 70 and the ram 72 aligned to move against only the lower portion M1 of the mound M in FIGS. 1, 14, 15, and 16. The ram 72 moves in a plane extending through the axis of the cradle and perpendicular to the longitudinal axis of the cradle.

Rotation of the handle 67 by the user's other hand moves the ram against the portion M1 of the mound M and returns that portion of the expanded metal to its intended position as illustrated in FIGS. 14 and 15.

The ram 72 includes a rearward plate 73 that engages the body portion 61 beneath the cradle when one of the mound portions is restored to its intended position, as in FIGS. 15 and 16. The ram 72 is thus prevented from damaging the pipe by moving any closer to the cradle 26 than is necessary to return the displaced metal to its intended position.

The first step of the restoration process is completed when the portion M1 has been returned to its intended position. Then the handle 67 is manipulated to move the ram 72 away from the cradle 70 and permit the utility tool to be manually held against the pipe with the ram 72 in alignment with the upper mound portion M2 as shown in FIG. 16. The handle 67 is then manipulated to carry out the second step of the process by moving the ram 72 against the mound portion M2 to return that portion of the expanded metal to its intended position.

The return of the portions M1 and M2 of the mound M to their intended positions closes the rupture R to a slit S, as shown in FIG. 16. The slit S extends parallel to the axis of the pipe, as shown in FIG. 2. The repair is completed by coating the inner surface of a C-clip with a bonding agent and clamping the C-clip over the slit S.

ALTERNATE EMBODIMENT OF THE UTILITY TOOL

An alternate embodiment of the utility tool 60 is illustrated in FIG. 19, wherein like parts bear the same reference number as parts of the utility tool previously described. The alternate embodiment of FIG. 19 is like the previously described embodiment of the utility tool except that an auxiliary cradle A is nested within the primary cradle 70 to receive a smaller diameter pipe than the cradle 70. For example, the cradle 70 may be dimensioned to receive a ¾ inch pipe and the auxiliary cradle A dimensioned to receive a ½ inch pipe. The auxiliary cradle A is releasably connected to the primary cradle 70 as by a screw 75 extending through the cradle 70 and into the auxiliary cradle A.

There is thus provided a utility tool for use with a family of C-clips intended for the rapid and easy repair of ruptures in different kinds of pipe without the need for a plumber's skill.

Although specific terms have been employed in describing the invention, they have been used in a descriptive and generic sense and not for the purpose of limitation.

I claim:

1. A method of permanently repairing a rupture in the wall of a copper water pipe having a mound of outwardly expanded metal surrounding the rupture with portions of the mound on opposite sides of the rupture, said method comprising the steps of:
   (a) providing a tool movable against selected portions of the mound;
   (b) positioning the tool to move against the portion of the mound on a first side of the rupture;
   (c) moving the portion of the mound on said first side of the rupture to its intended position in line with the wall of the pipe;
   (d) positioning the tool to move against the portion of the mound on the second side of the rupture;
   (e) moving the portion of the mound on the second side of the rupture to its intended position in line with the pipe without moving the portion of the mound on the first side of the rupture, whereby a slit is defined in line with the wall of the pipe;
   (f) providing a rigid cover;
   (g) positioning the rigid cover over the slit; and
   (h) adhering the rigid cover to the pipe in sealing relation to the slit.

2. Apparatus for the repair of a rupture in a copper water pipe having a mound of outwardly expanded metal surrounding the rupture and for the restoration of the outwardly expanded metal to its original configuration in alinement with adjoining portions of the pipe, said apparatus comprising a utility tool including an arcuate cradle, a ram and a shaft threadably connected to the cradle and rotatably connected to the ram, means for arranging said arcuate cradle to snugly engage the portion of the pipe diametrically opposed to the ruptured area of the pipe, said ram not extending beyond a plane that passes through the longitudinal axis of the cradle, means for rotating the shaft to move the ram in a first operation toward the cradle and against only that portion of the mound on one side of the slit to thereby restore only that portion of the mound to its original configuration, means to then move the ram in a second operation toward the cradle and against only the remaining portion of the mound, whereby the mound is removed and the outwardly expanded metal is restored to its original position in alinement with the pipe, means for then covering the rupture, and means for adhering said covering means to the pipe in sealing relation to the rupture.

3. Apparatus according to claim 2 wherein the cradle is a first cradle shaped to receive a pipe of a selected diameter, and wherein an auxiliary cradle is releasably attached to the first cradle and shaped to receive a pipe of a different diameter.

4. Apparatus for the repair of a rupture in a copper water pipe having a mound surrounding the rupture defined by outwardly expanded metal, said apparatus comprising means for restoring the mound to its intended position in line with the pipe to define a slit in the ruptured area of the pipe, wherein said means is a utility tool including an arcuate cradle having an inner diameter corresponding to the outer diameter of the pipe to be repaired and the cradle being adapted to be positioned in operative use behind the mound surrounding the rupture to be repaired, the ram not extending beyond a plane that passes through the longitudinal axis of the cradle, whereby the ram is movable against only that portion of the mound lying on the same side of said axis as the ram when the pipe is operatively positioned in the cradle and the ram is movable in successive operations against only selected portions of the mound to return those portions of the mound to their intended positions independently of the remainder of the mound, means for covering the slit, and means for adhering said covering means to the pipe in sealing relation to the slit.

5. Apparatus according to claim 4 wherein said means for covering the slit is a rigid cover shaped to clamp over the slit.

6. Apparatus according to claim 5 wherein means are provided for defining a space between the medial portion of the cover and the slit, and wherein a bonding agent adheres the rigid cover to the pipe in sealing relation to the rupture.

7. Apparatus according to claim 5 wherein the rigid cover includes peripheral edges which snugly engage the pipe when operatively assembled, and wherein solder adheres the rigid cover to the pipe in sealing relation to the rupture.

8. Apparatus according to claim 6 wherein the rigid cover includes peripheral edges which snugly engage the pipe when operatively assembled, and wherein solder adheres the rigid cover to the pipe in sealing relation to the rupture.

9. A utility tool comprising a base, a transversely extending arcuate cradle fixed to one end of the base and opening toward the opposite end of the base, and a ram mounted on the said opposite end of the base for reciprocable movement along the base, said ram not extending beyond a plane passing through the longitudinal axis of the cradle, a shaft threadably connected to the cradle and loosely connected to the ram, means limiting movement of the ram toward the cradle, means limiting movement of the ram away from the cradle, said shaft extending beyond both said ends of the base, a handle, means removably mounting the handle on either end of the shaft to rotate the shaft, and means releasably retaining the handle on a selected end of the shaft.

10. Apparatus for use during the repair of a rupture in a copper water pipe having a mound surrounding the rupture defined by outwardly expanded metal, said apparatus comprising a utility tool for restoring the mound to its intended position in line with the pipe to define a slit in the ruptured area of the pipe, said utility tool including an arcuate cradle having an inner diameter corresponding to the outer diameter of the pipe to be repaired and the cradle being adapted to be positioned in operative use behind the mound surrounding the rupture to be repaired, and a ram not extending beyond a plane that passes through the longitudinal axis of the cradle, whereby the ram is movable against only that portion of the mound lying on the same side of said axis as the ram when the pipe is operatively positioned in the cradle and the ram is movable in successive operations against only selected portions of the mound to return those portions of the mound to their intended positions independently of the remainder of the mound.

* * * * *

UNITED STATES PATENT AND TRADEMARK OFFICE
CERTIFICATE OF CORRECTION

PATENT NO. : 4,890,373

DATED : Jan. 2, 1990

INVENTOR(S) : William G. Hunt

It is certified that error appears in the above-identified patent and that said Letters Patent is hereby corrected as shown below:

Column 2, lines 28-51, operations 8-12 should be moved to the first row, following operation 7, and operations 15-19 should be moved to the second row, between operations 14 and 20.

Signed and Sealed this

Twenty-fourth Day of December, 1991

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,890,373

DATED : Jan. 2, 1990

INVENTOR(S) : William G. Hunt

It is certified that error appears in the above-identified patent and that said Letters Patent is hereby corrected as shown below:

Fig. 8, should be deleted and replaced with Fig. 8 as shown on the attached sheet.

Signed and Sealed this

Twenty-fifth Day of February, 1992

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,890,373
DATED : January 2, 1990
INVENTOR(S) : William G. Hunt

It is certified that error appears in the above-identified patent and that said Letters Patent is hereby corrected as shown below:

On the title page, in the Abstract, line 2, change "firmly" to --family--.

Signed and Sealed this

Twenty-first Day of April, 1992

Attest:

HARRY F. MANBECK, JR.

*Attesting Officer*  *Commissioner of Patents and Trademarks*